Aug. 30, 1949.　　　　　V. STROH　　　　　2,480,428
SELF-HELP STORE REGISTER
Filed Dec. 15, 1945　　　　　　　　　　　　6 Sheets-Sheet 1

INVENTOR
VICTOR STROH
BY John H. Cassidy
ATTORNEY

Aug. 30, 1949.  V. STROH  2,480,428
SELF-HELP STORE REGISTER
Filed Dec. 15, 1945  6 Sheets-Sheet 2

FIG. 4

INVENTOR
VICTOR STROH
BY John H. Laudig
ATTORNEY

Aug. 30, 1949.　　　　　V. STROH　　　　　2,480,428
SELF-HELP STORE REGISTER
Filed Dec. 15, 1945　　　　　　　　　　　　　　　　6 Sheets-Sheet 3

INVENTOR
VICTOR STROH
BY *John H. Cassidy*
ATTORNEY

Aug. 30, 1949.　　　　V. STROH　　　　2,480,428
SELF-HELP STORE REGISTER
Filed Dec. 15, 1945　　　　6 Sheets-Sheet 4

FIG. 10

INVENTOR
VICTOR STROH.
BY John H. Cassidy
ATTORNEY

Aug. 30, 1949.  V. STROH  2,480,428
SELF-HELP STORE REGISTER
Filed Dec. 15, 1945  6 Sheets-Sheet 5

FIG. 11

INVENTOR
VICTOR STROH
BY John H. Cassidy
ATTORNEY

Aug. 30, 1949.  V. STROH  2,480,428
SELF-HELP STORE REGISTER
Filed Dec. 15, 1945  6 Sheets-Sheet 6

INVENTOR
VICTOR STROH
BY John H. Cassidy
ATTORNEY

Patented Aug. 30, 1949

2,480,428

UNITED STATES PATENT OFFICE 2,480,428

SELF-HELP STORE REGISTER

Victor Stroh, Webster Groves, Mo., assignor of fifty-one one-hundredths to Sam Esgro, and forty-nine one-hundredths to Charles Arthur Jean, Mrs. Charles W. Jean, and Ralph Nelson Jean, all of Memphis, Tenn.

Application December 15, 1945, Serial No. 635,232

15 Claims. (Cl. 235—1)

This invention pertains to registers and registering systems generally, and concerns itself more particularly with a register and registering system which may be employed to record a series of transactions in a portable register, the same being subject at a later time to a clearance operation which will transfer the registration of the portable machine to a master register simultaneously with the clearing operation.

It is a general aim of the invention to provide a portable register adaptable for use in a registration system which may be actuated by a cost set-up mechanism to effect a registration therein, and thereafter be cleared by a clearing device associated with a master register unit and in such a manner that the clearing operation will simultaneously effect a transfer of the registration of the portable register to the master register.

It is also an object of the invention to provide a register actuating device having a plurality of set-up bars adjustably movable within a base to fixed positions characteristic of a desired registration combination which base is movable upon operation of a given operating mechanism to cause said bars to effect a desired registration in a registering device.

Still another object of the invention is to provide a portable register having means associated therewith operable by a register actuating device in a first instance to set up a registration therein, and operable by a register clearing device in a second instance to clear from the portable register a registration contained therein and simultaneously transfer the identical registration to a master register as the portable register is cleared to a zero setting.

A further object of the invention is to provide a register having a plurality of registering dials actuated by a plurality of set-up bars movable in a first instance to rotate the said registering dials in one direction to effect a registration, and movable in a second instance to rotate said dials in an opposite direction and return them to a zero setting, said rotation of said dials being effected by a double pawl ratchet system in which a first and second pawl is carried on a ratchet arm moved by the said set-up bars one of the pawls being cammed into engagement with a ratchet wheel and the other pawl being cammed out of engagement therewith on operation of a releasing cam.

It is a further object of the invention to provide a register having a plurality of set-up bars movable in a first instance to effect a registration and in a second instance to return the registering dials of the register to a zero setting, said set-up bars being actionable upon their movement in a second instance to actuate the set-up bars of a second register of like character in their first instance to transfer to the second register the registration cleared from the first.

Another object of the invention is to provide a register clearing device and master register unit having means for mounting a portable register in a manner whereby the same may be moved into position between a register clearing device and a master register to occupy a position in which the clearing bars of a clearing device may be moved to actuate the set-up bars of the portable register to return a registering mechanism of the latter to a zero setting and simultaneously move the set-up bars of a master register to effect a registration therein identical to that cleared from the portable register.

It is also a purpose of the invention to provide a register and a registering system in which the register may be employed to receive a cost registration upon the actuation of a cost set-up device rendered actionable by the operating mechanism of a given device which register may thereafter be transferred to a register clearing and master register unit wherein the same may be moved into position between a register clearing device and a master register and thereafter cleared to a zero setting by operation of the clearing device which operation will simultaneously transfer the registration of the cleared register to the master register.

Other objects and advantages will become apparent as the description proceeds and a more comprehensive understanding of the invention will be afforded from the following detailed description when considered in conjunction with the accompanying drawings, in which like reference numerals have been used throughout the various views to designate like parts, and, in which Fig. 5 is a side elevational view of the unit illustrated in Fig. 4, Figs. 6 and 7 are plan and side views respectively of a locking mechanism for the register clearing device shown in Fig. 4, Figs. 8 and 9 are side and ends views respectively of the portable register clamping and carriage locking mechanism employed in the unit shown in Fig. 4.

Although the register and register system here to be described is adaptable to many widely different and various uses, it will be treated, by way of example, in connection with its use as a cost register and registering system for customer operated merchandising machines, such as that described in a co-pending application filed by Sam Esgro, for Article dispensing device, U. S. Serial No. 641,439, filed January 16, 1946. It is to be expressly understood, however, that no limitation as to any particular use is thus intended.

As illustrated in the drawings the instant invention contemplates, in its preferred embodiment, a register actuating mechanism 21 which may be rendered operable upon the functioning of a given operating mechanism to set up a given registration in a portable register 22. The register 22, illustrated more fully in Figs. 10 to 16 inclusive, may be constructed as a portable register which may be moved to a series of individual register actuating mechanisms such as 21 to receive therein a total registration made up of the individual registration received from each of the actuating devices. Thereafter the portable register may be moved to a register clearing-master register unit 23 illustrated in Fig. 4. The latter unit comprises a register clearing device 24, a portable register mount 25, and a master register 26, and together with the register actuating device 21, and the portable register 22 form a complete register system. Such a system, when employed as outlined above, makes possible a novel collecting and auditing scheme for self-service stores which will be developed later in discussing the system's operation.

In presenting the subject matter of the instant invention, each of the component parts of the system will be described first and thereafter their composite functions will be treated.

Figures 1, 2, 3:
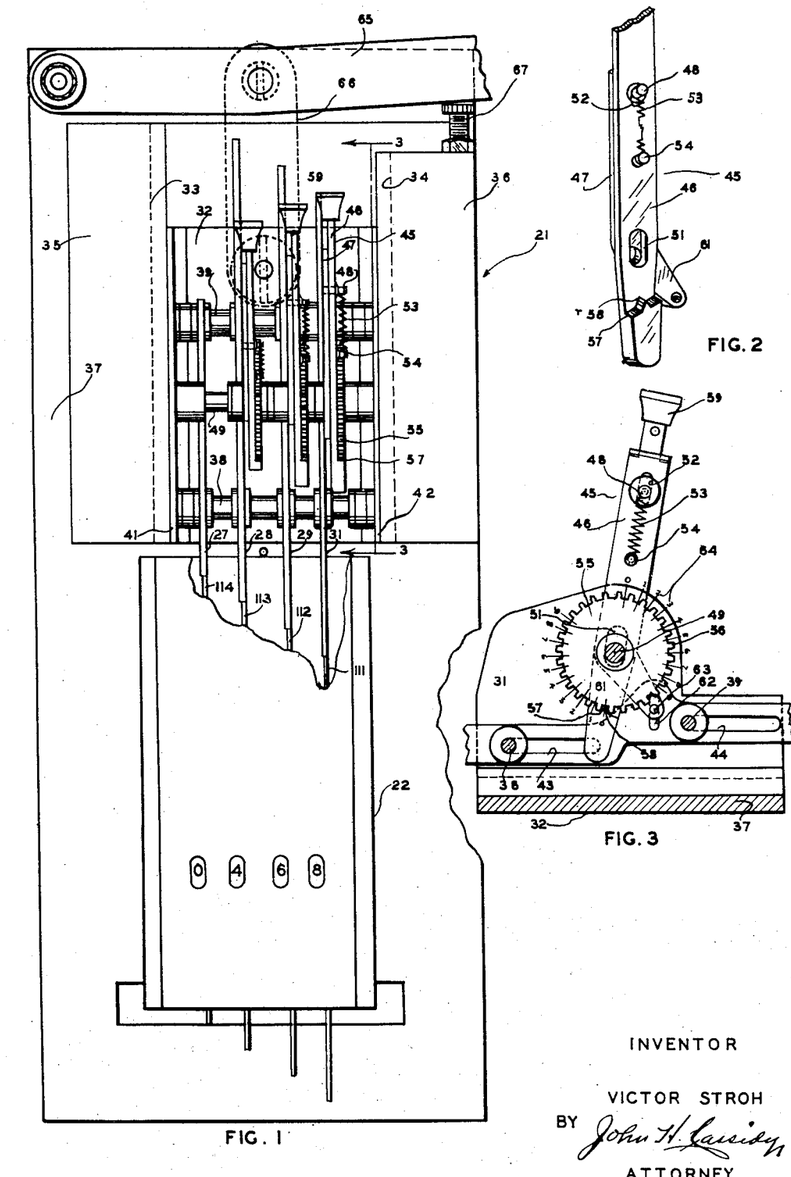
Fig. 1 is a plan view showing a register actuating device constituting a component part of the instant invention, and showing the same associated with a portable register also forming a component part of the registering system embodied in the instant invention.
Fig. 2 is a perspective view of a set-up bar actuating lever employed in the register actuating device illustrated in Fig. 1.
Fig. 3 is an elevational sectional view of the register actuating device shown in Fig. 1 taken along the line 3—3 of Fig. 1.

The register actuating device 21 illustrated in Fig. 1 comprises a plurality of elongated set-up bars 27, 28, 29 and 31. These set-up bars are mounted on a movable base 32 which slides in a pair of tracks 33 and 34 channelled in the internal face of a pair of mounting blocks 35 and 36 respectively which support the movable base 32 on a platform 37.

Each of the set-up bars 27 to 31 are mounted on two shafts 38 and 39 which extend between two up-rights 41 and 42 carried on the movable base 32. These bars, excepting bar 27 which is stationary, are also provided with slots 43 and 44 through which the shafts 38 and 39 extend, and longitudinal movement of the set-up bars over the said shafts is thus provided for.

For moving each of the set-up bars 28 to 31 longitudinally an actuating lever 45 is provided. Each of the levers, only one of which will be described, are made up of a ratchet arm 46 and an actuating arm 47 pinned together by means of a shouldered pin 48. Both of the arms 46 and 47 are mounted for rotation on an actuating lever shaft 49 which parallels the shafts 38 and 39 and extends between the up-rights 41 and 42. The arm 46 is slotted at 51 to permit its parallel movement with respect to the arm 47. The arm 46 is also slotted at 52 so that it may move on the pin 48 which is headed to receive one end of a tension spring 53 secured at its other end to the arm 46 by a pin 54. For each of the respective actuating levers a ratchet wheel 55 is pinned to the shaft 49. These wheels which have their peripheral edges broken by series of ratchet teeth 56, are held against rotation on the shaft 49. Each ratchet arm 46 is shouldered at 57 and carries a single ratchet tooth 58 which is moved into or out of engagement with the teeth 56 of its respective ratchet wheel. Thus as the arm 46 is depressed by means of a key 59 the same is moved relative to the arm 47 and the ratchet tooth 58 is withdrawn from the teeth 56. In its depressed position, the arm 46 and the arm 47 which is attached thereto, may be rotated about the shaft 49 to any one of a series of ten positions numbered from zero to nine. Such movement of the actuating lever 45 causes a projection 61 of the arm 47 to move its respective set-up bar through a measured distance, the same being effected through a slot 62 and pin 63 connection between the bar and the projection 61. A graduated dial carrying suitable indications 64 is provided for indexing the movement of the various actuating levers 45 to one of their ten selectable positions.

Under this arrangement the separate set-up bars may be adjusted to fixed positions with respect to their movable base 32. Thus the set-up bar 28 may be moved by its actuating lever to occupy its fourth position; the set-up bar 29 to its sixth position and the set-up bar 31 to its eighth position. The movable base 32 is then moved to an operative position by means of an actuating arm 65 which is connected to the base 32 by a link 66. A register, such as 22, may then be positioned with respect to the register actuating mechanism as shown in Fig. 1. Thereafter as the actuating arm 65 is moved in a clockwise direction the movable base is carried forward to move each of the set-up bars 27, 28, 29 and 31 through a measured distance which is determined by an adjustable stop 67 screwed into an end face of the mounting block 36. Such movement of the base 32 carries the aforementioned set-up bars into the register 22 to cause the same to effect a desired registration, which in this case would be $4.68, if the register were arranged to record dollars and cents.

Figure 10:
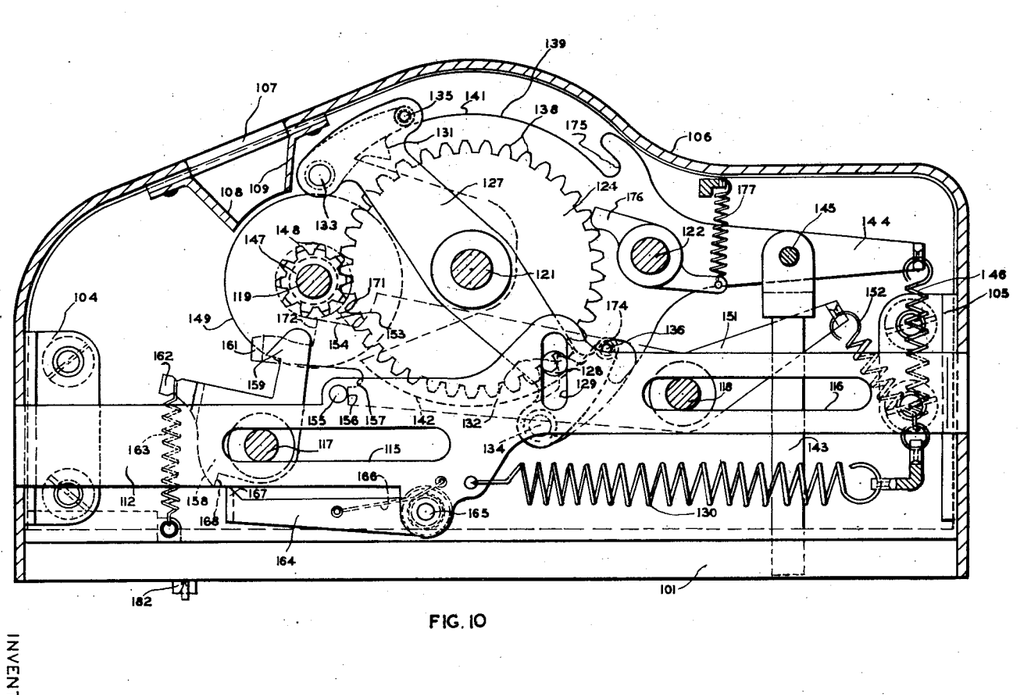
Fig. 10 is a vertical sectional view of a registering device forming a part of the instant invention.

A register which may thus be actuated is illustrated in Fig. 10. In this particular embodiment, the register comprises a base 101 that supports a pair of said plates 102 and 103. The two side plates are connected by a front guide plate 104 and a rear guide plate 105 and the entire register is closed at the top by a cap 106 in which a dial window 107 is located. The window 107 is bracketed by two focus plates 108 and 109 which restrict the view through the window to one digit registration of a registering dial made up of a plurality of dial wheels.

Figure 11:
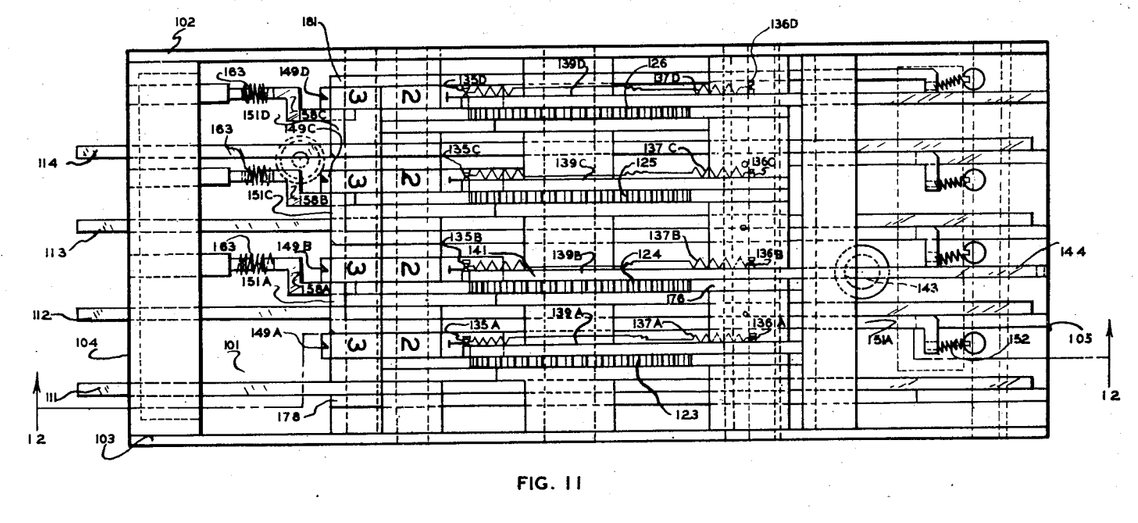
Fig. 11 is a plan view of the registering device shown in Fig. 10.

As best viewed in Fig. 11 the front and rear guide plates 104 and 105 support a plurality of set-up bars 111, 112, 113 and 114. Each of these bars are provided with slots 115 and 116 which extend longitudinally in the fore and aft sections thereof. Extending through these slots is a carry arm lock shaft 117 and a carry arm shaft 118 both of which terminate in the side plates 102 and 103. Likewise three other shafts, a dial shaft 119, a ratchet arm and gear shaft 121 and a ratchet pawl cam shaft 122 extend through the device from the side frame 102 to the side frame 103. Respectively associated with each of the set-up bars 111, 112, 113 and 114 are four ratchet gears 123, 124, 125 and 126. Each of these gears is mounted for rotation about the ratchet arm and gear shaft 121, and is rotated by the longitudinal displacement of their respective set-up bars. Here a ratchet arm 127 (Fig. 10), which is also mounted for rotation about the shaft 121, performs this function.

Each ratchet arm, only one of which will be described, carries a pin 128 that extends into a slot 129 in its respective set-up bars. Thus, as a set-up bar, for example 112, is moved in a first instance to the left (Fig. 10) the ratchet arm 127 is moved in a clockwise direction and as the set-up bar is moved in a second instance to the right under the forces of its individual spring 130, the ratchet arm 127 is moved in a counter-clockwise direction. Through this action of the ratchet arm 127 the ratchet wheel 124 is moved about the shaft 121 in a clockwise direction when the bar 112 is displaced in its first instance and in a counter-clockwise direction when the same is moved in its second instance. This rotation is effected by means of two pawls 131 and 132 which are pivoted for movement about a pair of pins 133 and 134 respectively connecting the pawls to the ratchet arm 127. Each pawl carries a pin 135 and 136 which are tied together by a tension spring 137 that urges them toward engagement with a series of teeth 138 on the ratchet gear 124.

For each of the two pawls carried on each ratchet arm, a ratchet pawl cam 139 is provided which is pivoted for movement about the shaft 122. This cam has a cam surface 141 which engages the pin 135, and a cam surface 142 which engages the pin 136 as each cam 139 is rocked about its shaft 122 by means of a clearing mechanism shift rod 143, connected to its arm 144 by a pin 145. Either the pawl 131 or the pawl 132 is urged into engagement with the ratchet gear 124 by the spring 137 depending upon which cam surface 141 or 142 is active.

As illustrated in Fig. 10 the shift rod 143 is depressed to a normal registering position by a spring 146 acting on the arm 144. When the rod 143 is thus depressed, the cam surface 141 is urged against the pin 135 to raise the pawl 131 out of engagement with the teeth 138 of the ratchet gear 124. Simultaneously, the cam surface 142 is raised, thus permitting the forces of spring 137 to urge the pawl 132 into engagement with the teeth of the ratchet gear 124. Under such conditions and as the set-up bar 112 is moved to the left through a measured distance the pawl 132 will ride over a given number of the teeth 138, dependent upon the displacement of the set-up bar 112, and thereafter under the forces of the spring 130 acting on the set-up bar 112, will rotate the ratchet gear 124 in a counter-clockwise direction through a given angular displacement. Rotation of the ratchet gear 124 in this manner rotates a dial pinion 147 which has ten teeth 148 meshing with the gear 124. Rotation of the dial pinion 147 in this instance will be in a clockwise direction. A dial wheel 149 which is attached to the pinion 147 is therefore rotated with the dial pinion through one of ten positions or a multiple thereof depending upon the longitudinal displacement of the set-up bar 112. The dial wheel 149 in turn carries the digits zero and one to nine inclusive which occupy ten spaced positions on the peripheral edge of the wheel. Thus in performing a given registration the set-up bars of the device are moved through measured distances to cause their respective dial wheels to be rotated through one of these positions or a multiple thereof to present the required digit to the window 107 as an indication of the registration.

Figures 12, 13, 14, 15, 16:
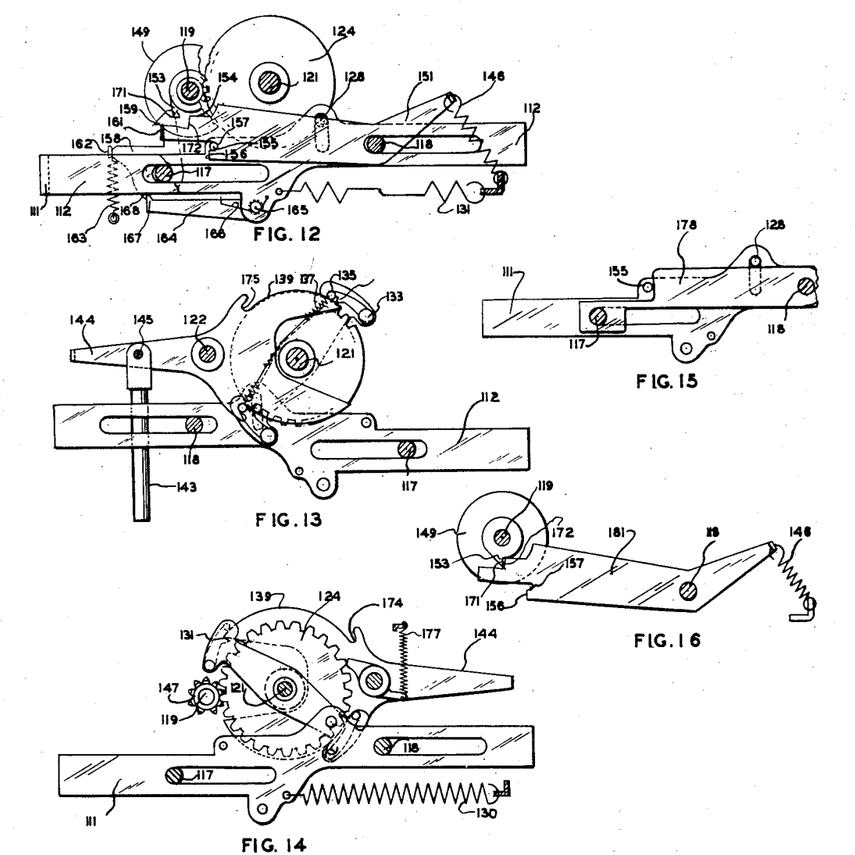
Fig. 12 is a side elevational view of a unit of registering mechanism of the register illustrated in Fig. 10 showing means for carrying registrations from a dial of lower to a dial of higher order.
Fig. 13 is a side elevational view of a set-up bar and its associated mechanisms.
Fig. 14 is a view similar to Fig. 13 showing an opposite side of the set-up bar.
Fig. 15 is a side view of a set-up bar of a first order.
Fig. 16 is a side view of a carry bar for a set-up bar of last order.

If the set-up bar 111 (Fig. 11) be considered as a unit bar, the bar 112 as tenths, the bar 113 as hundredths and so forth, then the dial wheel associated with the bar 111 may be considered as of a lower order than that of the wheel associated with the set-up bar 112 and so on. To effect continued registration means must be provided to carry the register of a dial of a lower order to that of a higher order when the former is rotated through ten of its positions. To perform this function a carry arm 151 (Fig. 10) is associated with each of the set-up bars, less one, and is arranged to be pivoted about the shaft 118 by means of a spring 152 which urges each of the carry arms to a normal raised position as illustrated in Fig. 10. Here again, only one carry mechanism will be described, it being understood that the arrangement is the same for each set-up bar with minor exceptions later to be explained. A carry cam 153 which is attached to the dial wheel 149 is rotated therewith and is operative in a clockwise direction to cam against a cam follower surface 154 on the carry arm 151 to rock the latter to its locked position as illustrated in Fig. 12. Each set-up bar, such as 112, has fixed thereto a pin 155 which in the normal position of the carry arm 151 rides against a shoulder 156 forming a part of the latter element. The pin 155 is urged against the shoulder 156 by the forces of the spring 130. When the carry arm associated with a set-up bar of higher order is rocked to its locked position by the carry cam 153 associated with a dial wheel of lower order the pin 155 on the set-up bar of higher order is moved into a slot 157 of that bar so dimensioned as to cause the set-up bar of higher order to move through a distance to the right such as will rotate the dial wheel of the higher order through one position. In this manner when the dial wheel of the lower order is rotated from its ninth to zero position the dial wheel of next higher order is conditioned to carry one place equivalent to the ten positions of the wheel of lower order.

It will be apparent to those skilled in the art that the action of the carry cam to depress one of the carry arms may occur at a time when the set-up bar associated with that particular bar is being displaced to the left by the action of the set-up bars of the register actuating device 21, above described. If such condition occurs it is apparent that means must be provided to lock the carry arm in its depressed position so that when the set-up bar of the register actuating device is withdrawn, a carry action will be effected. Thus, for the set-up bar 112, it would be necessary that the carry arm 151 be locked in its depressed position to that the pin 155 would be carried into the slot 157 whenever the bar 112 is permitted to return to its normal position. Such a mechanism takes the form of a carry arm lock 158 one of which is provided for each of the set-up bars, less one, and each of which is pivoted for movement about the shaft 117. The carry arm lock 158 takes the form of a bell crank, one arm of which is fashioned into a hook 159 that engages a bent section 161 of the carry arm 151 and the other arm 162 of which takes the form of a spring lever. This latter arm is moved under the forces of a spring 163 to continuously urge the hook 159 into engagement with the bent section 161 in a manner such that the carry arm is retained in its lower position until subsequently released.

The release just mentioned is effected by subsequent movement of the set-up bar with which the lock is associated. Thus a carry release arm 164 which is pivoted for movement on the carry arm 112 about a pin 165 is continuously urged for rotation in a clockwise direction by means of a coil spring 166. A pawl 167 carried on the arm 164 is thus brought into engagement with a notch 168 in the spring lever 162 section of the carry arm lock 158, when the latter is in its locking position. Then, as the set-up bar 112 is subsequently moved through the action of the register actuating device, the arm 164 is carried forward to physically rock the lock 158 in a clockwise direction about the shaft 117 thereby withdrawing the hook 159 from engagement with the bent section 161 and releasing the carry arm 151 for rotation to its upward position. For such release the set-up bars of the register actuating device previously described are adjusted to move each of the set-up bars of the register through a minimum distance regardless of whether a registration is to be made or not.

In order to clear the register or return each of the dial wheels, such as 149, to their zero setting, a clearing mechanism, involving the use of some of the parts already described, is provided. Thus, the carry cam 153 of each dial wheel is provided with a stop face 171 which is moved when the dial pinion 147 of that wheel is rotated in a counter-clockwise direction, against a stop face 172 on the carry arm associated with that particular carry cam. As previously described, when the ratchet pawl cam 139 is positioned as illustrated in Fig. 10, the pawl 132 is conditioned with respect to the ratchet gear 124 to cause the dial wheel 149 to be rotated upon displacement of the set-up bar 112 to effect a registration. In a similar manner when the shift rod 143 is raised, under an action that will later be described, to depress the cam face 142, then the pin 136 is cammed to withdraw the pawl 132 from engagement with the teeth 138 of the ratchet gear 124. Simultaneously the cam face 141 moves downwardly and allows the pin 135 to ride downwardly under the forces of the spring 137 to draw the pawl 131 into engagement with the teeth 138. When the parts are thus conditioned the pawl 132 is inoperative and the pawl 131 is conditioned upon movement to the left by the set-up bar 112 to cause rotation of the ratchet gear 124 in a clockwise direction. This rotation of the ratchet gear 124 will cause rotation of the dial pinion 147 in a counter-clockwise direction and will turn the carry cam 153 until the stop face 171 thereof engages the stop face 172 on the carry arm 151.

As will be described more fully the actuating bars of the clearing device are moved yieldably through action of tension springs, and when the register is cleared by this device each of the set-up bars of the register is displaced to the left, a distance which will rotate the carry cam 153 and its associated mechanism only until it engages the stop 172. When a carry cam 153 is moved to the point where its stop face 171 is engaged with the stop 172, then the registering dial 149 is moved to its zero position and the zero digit is presented to the window 107. In this manner each of the dials wheels of the registering device is returned to its zero setting.

In connection with the above described action which obtains when the register is cleared, it will be apparent that the rod 143 serves as a clearing mechanism shift. Thus, the parts of the register just described are shifted into positions to condition the same to be cleared when the rod 143 is raised.

It will be obvious that each of the springs 130 must be of a size something in excess of that required to move all of the parts which they operate. It will be apparent further that the movement of the ratchet arm 127 must be restricted to certain limits so that the number of teeth passed over and engaged by the pawls 131 and 132 correspond accurately to the measured distance, the set-up bar is displaced. Accordingly, stop means must be provided to limit the movement of each ratchet arm, particularly in the direction where movement is effected by the force of a spring 130. To provide for such limits, each ratchet pawl cam, such as 139, is formed with a notch 174 into which the pin 136 is moved. This notch provides a zero stop for arresting the movement of the ratchet arm 127 when the pin 136 engages in it. For arresting the movement of the arm 127 in the opposite direction, a similar notch 175 is likewise provided.

In a similar vein, unwarranted rotation of the ratchet gear 124 due to inertia of the various moving parts must be prohibited. Protection against such rotation is provided by a brake 176, which is pivoted for rotation about the shaft 122 and is urged into continuous engagement with the teeth 138 of the gear 124 by means of a spring 177.

As previously stated each set-up bar and its associated mechanism which form a registering unit, is the same, with minor exceptions here to be explained. Although illustrated as having only four dial wheels, the register may have as many registering units as requirements dictate. In any case the unit of lowest order will differ slightly from that of the next highest order and the last unit will likewise be different from all of the units of lower order.

Thus, if we consider the set-up bar 111 and its associated mechanism (Fig. 11) as a registering unit A, set-up bar 112, as B; 113, as C; and 114, as D; then we may consider unit A as registering units; B, tenths; C, hundredths; and D, thousandths. Then, for the set-up bar 111, no carry arm 151 will be necessary, since the dial wheel 149A is of the lowest order and cannot receive a carry registration. All that is required for the set-up bar 111 is a stationary stop bar 178 (Fig. 15) which presents a shoulder 179 for the pin 155 of the bar 112 to ride against.

Similarly, the carry arm of the last, or highest, order unit D will not require the locking mechanism 158 described above, since the registration of the dial wheel 149D cannot be carried higher. A carry arm 181 (Fig. 16) is required, however, which is similar to the arm 151, (Fig. 10) the only difference being that of the omitted bent section 161. In all other respects, the units are the same as described above in conjunction with Fig. 10. All intermediate registering units such as B and C are identical.

With further reference to the register 22 and in accordance with the teachings of the aforementioned co-pending application, a key 182 may be fixed to the base 101 which will condition a machine or other apparatus for operation. In such an application the register 22 together with the key 182 may be thought of as a check and the machine or other apparatus as a check controlled device.

As previously stated, the registering system contemplates a register clearing and master register unit into which the portable register, just described, may be positioned for clearing, the same transferring the registration therein recorded to a master register. This unit generally designated by the reference numeral 23 and illustrated in Fig. 4 comprises a base 201 on which is mounted the register clearing device 24, the portable register mount 25 and the master register 26.

The clearing device 24 comprises a bottom plate 202 by means of which it is attached to the base 201. The bottom plate 202 carries two side plates 203 and 204 which are closed at their ends by a front guide plate 205 and a rear guide plate 206. These guide plates are grooved to retain and support in parallel relationship a plurality of actuating bars 207, 208, 209 and 211. Under the longitudinal movement of these actuating bars 207 to 211 inclusive the set-up bars 111, 112, 113, and 114 of the portable register 22 are displaced longitudinally for clearing the same to its zero setting. Extending through the clearing device between the side frames 203 and 204 is a shaft 212 which is adapted to be rotated by means of a crank 213. Keyed to the shaft 212 is a crank 214 which is made up of a plurality of fingers 215, one for each of the actuating bars 207-211. In the terminal ends of each of the fingers 215, a hole 216 is drilled, through which a pin 217 is extended. Four springs 218 are used to yieldably link each to each of the actuating bars to the crank 214. That is to say, each spring 218 has one of its ends connected to the pin 217 and the other end to its respective actuating bar through a hole 219 drilled therein. As the crank 213 is rotated in a counter-clockwise direction (Fig. 4) the fingers 215 of the crank 214 are rotated in a counter-clockwise direction to move the actuating bars 207-211 to the left through the forces of the springs 218. In order that the bars 207-211 may be withdrawn upon rotation of the crank 213 in a clockwise direction each of the bars are provided with a depending bracket 221 against which the pin 217 is urged to move the actuating bars to the right.

The portable register mount 25 is employed to accurately position the portable register 22 with respect to the register clearing device 24. This amount, includes a base 222 which is formed with a beveled channel 223 on its under side to engage and slide over a beveled track 224 secured to the base 201 by the screws 225. To the base 222 a guide flange 226 is also fixed, against which the portable register 22 is placed. Also carried on the base 222 is a front clamp 227, the lip of which engages a stud 228 on the portable register 22 to hold the same in position on the mount. Acting in conjunction with the clamp 227 is a rear clamp 229 also attached to the base 222 and so dimensioned as to permit a shoulder 230 on the frame of the portable register 22 to be moved thereunder. A shift rod stud 231 which extends above the top face of the base 222 a sufficient distance to move the shift rod 143 of the portable register upwardly thus moving the clearing cams 139 thereof into clearing positions when the register is clamped to the mount, the clearing mechanism of the portable register being thus automatically conditioned to permit the clearing device 24 to return its dials to their zero settings. A recess 232 is also formed in the base 222 to accommodate the key 182.

Figure 8:
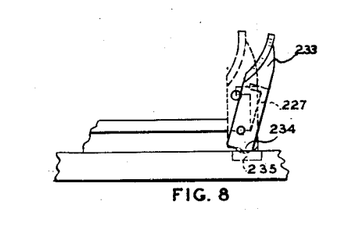
Figure 9:
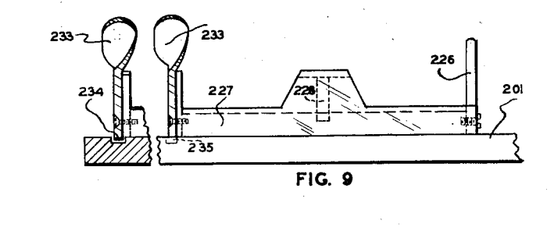

To prevent the mount 25 from being moved into its second position between the clearing device 24 and the master register 26 before the portable register carried thereon is properly conditioned for clearance, the clamp 227 is so arranged that it must be turned to a clamping position before the mount may be moved. Thus, as a clamp operating lever 233 is rocked in a clockwise direction (Fig. 8) to move the clamp 227 to its unclamping position, a lug 234 extending from the end of the lever 233 is depressed into a recess 235 in the base 201. Accordingly, the mount 25 cannot be moved from its first position to its second position until the clamping lever 233 is rotated in a counter-clockwise direction to withdraw the lug 234 from the recess 235 which action clamps the register 22 downwardly on the mount 25 until the shift rod stud 231 is forced into the portable register 22 to raise the shift rod 143. In this manner, operation of the clearing mechanism is assured the moment the mount 25 can be moved along the track 224 to its second position.

Figure 4:
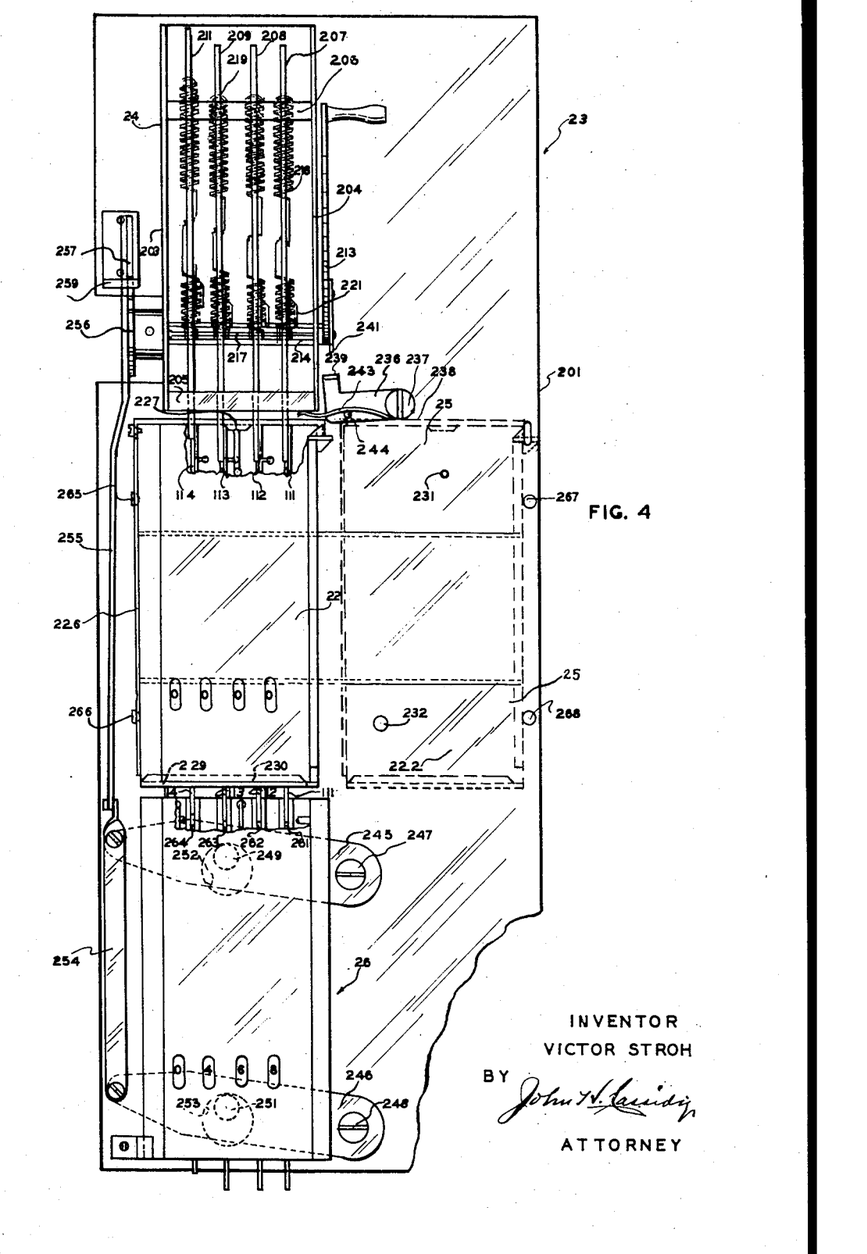
Fig. 4 is a plan view of a register clearing-master register unit forming a component part of the instant invention.
Figures 5, 6, 7:
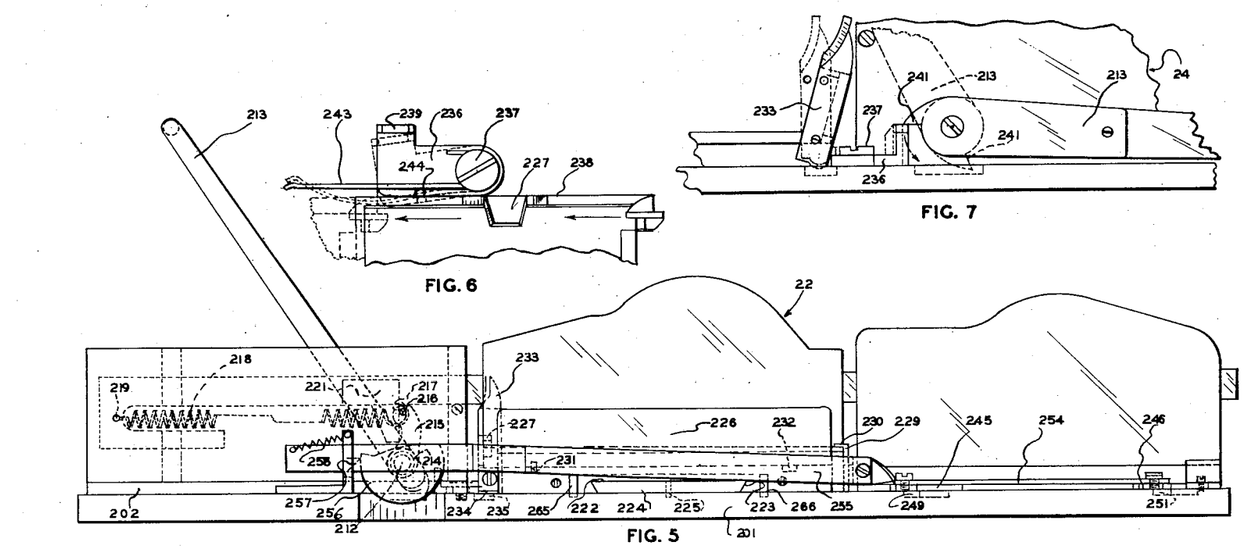

Means is also provided to prevent actuation of the crank 213 of the clearing device 24 until after the mount 25 has been moved into its second position since prior movement of the actuating bars 207-211 into the path of the register 22 might cause injury to both mechanisms. This safety means, takes the form of a latch 236 (Figs. 6 and 7) which is secured to the base 201 by a screw 237. The latch 236 is free to rotate about the screw 237 and is cammed in a clockwise direction (Fig. 4) by a face 238 of the clamp 227 to move a lug 239 into a position under a notch 241 on the handle 213. The crank 213 cannot be moved in a counter-clockwise direction when the parts occupy this position. When the mount 25 is moved from its dotted line position to its full line position as shown in Fig. 4, the latch 236 is pivoted in a counter-clockwise direction about the screw 237 by means of a spring 243 acting against a pin 244. This withdraws the lug 239 and releases the crank 213 for movement.

Since travel of the set-up bars 111, 112, 113 and 114 of the portable register 22 through a given minimum distance must be effected to actuate the carry mechanism of the master register 26 and further since tolerances must be allowed for the positionment of the portable register 22 between the cleaning device 24 and the master register 26, it is necessary that the master register be supported for longitudinal movement along the base 201. It is further necessary, after the portable register 22 has been positioned for clearing that the master register be brought into contact with the latter by movement through an accurate measured distance. Accordingly the master register 26 is mounted for movement on a pair of bars 245 and 246 which are pivoted for rotation about a pair of screw pins 247 and 248. The master register 26 is screwed onto these pins by means of bolts 249 and 251, the heads of which operate in recesses 252 and 253 bored in the base 201. Movement of the bars 245 and 246 about their respective pivot points is effected by means of a plurality of links 254 and 255. Fixed to the shaft 212 of the clearing device 24 is a cam 256 which is turned by the crank 213. This cam acts against a cam follower 257 attached to the link 255, and a spring 258, which is connected to the link 255 at one end and to a link guide bracket 259 at the other end, serves to maintain the master register in its extreme right hand position when the crank 213 of the register clearing device 24 is so turned as to present the short face of the cam 256 against its cam follower 257. In this position the master register 26 is withdrawn to its extreme right end position as viewed in Fig. 5 and the master register 22 may be moved with adequate clearance between it and the clearing device 24. As the crank 213 is rotated in a clockwise direction (Fig. 5) the long face of the cam 256 is moved against its cam follower 257 and through the links 254 and 255 the master register 26 is moved inwardly toward the portable register 22 by an accurate distance determined by the dimensions of the cam 256. Thereafter as the actuating parts of the clearing device 24 are moved to clear the portable register 22, the set-up bars 111, 112, 113 and 114 of the portable register 22 are moved into engagement with a like number of set-up bars 261, 262, 263 and 264 of the master register 26. Each of the set-up bars of the portable register 22 are moved through their measured distances as effected by the carry cams 153 of their respective registering dials moving against the stop face 172 of their respective carry arms. The set-up bars of the master register 26 are thus moved through identical distances and the registration which is cleared from the portable register 22 is transferred to the master register 26. Here the master register 26 is identical with that generally designated by the reference numeral 22, with the lone exception that the ends of the set-up bars 261, 262, 263 and 264 are lowered so as to contact the ends of the set-up bars 111, 112, 113 and 114 with which they must engage.

Accurate positionment of the portable register with respect to the clearing device 24 and the master register 26 is further provided for by a pair of stop pins 265 and 266 fixed into the base plate 201 against which the mount 25 is moved in its second position. Two other stop pins, 267 and 268, are likewise provided against which the mount 25 is moved when in its first position. The latter pins also prevent movement of the mount 25 off of its track 224.

*Operation*

In carrying out the illustrative example by way of its application to the aforementioned co-pending application it will be assumed that a register system embodying this invention is to be used in a self-service store. Under such condition the register clearing and master register unit 23 (Fig. 4) would be located at a cashier's stand occupying a position near the entrance to the store. The cashier would be provided with a number of the portable registers 22 one of which would be handed to each customer upon entrance to the store. Each article of merchandise capable of being vended by the machine described in the aforementioned co-pending application would be presented conveniently to the customer to be vended by such a machine. In such case a cost set-up mechanism 21 would be associated with each vending machine and the actuating arm 65 thereof would be connected for movement with the dispensing unit's operating mechanism all in a manner taught in the co-pending application. Here the keys 59 of the cost set-up mechanism 21 would be enclosed under conditions prohibiting movement of the cost set-up bars 27–31 inclusive, by any person other than the manager of the store or some other authorized person.

With the system's equipment thus arranged, the customer would position his individual register 22 on each vending machine from which he desires to select an article for purchase. Upon operation of the vending machine's operating mechanism the cost set-up mechanism 21 of that particular machine would set up a charge equal to the unit cost of the article vended in the portable register 22. After the customer has made all of the purchases which he desires to make, a total charge for these purchases will be recorded in the portable register 22, which he will then present to the cashier upon leaving the store. Here he will pay for his purchases an amount indicated by the total registration recorded in his individual register 22.

Upon receipt of payment from the customer, the cashier will then position the portable register 22 on its amount 25 of the unit 23. Next the portable register will be moved into the full line position as indicated in Fig. 4 and thereafter the cashier will move the crank 213 of the register clearing device 24 to clear the portable register 22 and return its dial wheels to their zero setting.

As the portable register 22 is cleared by the above described operation the set-up bars thereof will be made to actuate the set-up bars of the master register 26, and the registration cleared from the portable register 22 will be transferred to the master register.

At the close of the business day, the cashier of the store may be checked in a matter of a few minutes. All that is required of the auditor is to count the number of portable registers issued to the cashier at the beginning of the business day; see that all of the registers have been cleared to their zero setting in that particular cashier's clearing unit, and to thereafter check his cash receipts against the total recorded for the business period in the master register 26.

In order to trace the various functions of each operating mechanism through a complete cycle, let it be assumed that the cost set-up mechanism 21 is to be conditioned for use with a vending machine which is to dispense an article for which a charge of five cents each is to be collected. Let it be assumed further that a customer vends two of these articles from the machine making the total charge for his purchases to be ten cents. Under such conditions the key 59 controlling the set-up bar 31 will be moved to its fifth position, and the keys 59 controlling the set-up bars 28 and 29 will then be moved to their zero position. The set-up bar 27, which is stationary, will also occupy a zero position. Upon positioning the portable register 22 in proper relationship with the vending machine the key 182 carried on the base thereof will condition the machine for release and the customer will vend one of the five cent articles. Upon movement of the machine's operating mechanism the base 32 of the set-up mechanism 21 will be carried forward a measured distance which will move each of its set-up bars 27, 28 and 29 through minimum distances, and the set-up bar 31 through a measured distance which will move the set-up bar 111 of the portable register 22. Movement of the set-up bar 111 will cause rotation of its ratchet arm 127A (Fig. 11) in a clockwise direction over a measured number of teeth 138A of the ratchet gear 124A. Thereafter as the base 32 is moved to the rear to withdraw the set-up bar 31, the spring 130A will move the set-up bar 111 to the rear will cause the pawl 132A to engage the gear 124A rotating this latter element in a counter-clockwise direction. Such rotation will turn the dial pinion 147A, and in turn the dial wheel 149A through its fifth position which will present the digit five in the units column to the window 107.

As the second five cent article is vended by the customer this action will be repeated. However, as the dial wheel 149A is rotated through four more of its five additional positions it will turn from its ninth position to its zero position. During this period of time the carry pawl 153A associated with this wheel will cam the carry arm 151 associated with the set-up bar 112 from its raised position (Fig. 10) to its lower position (Fig. 12). Simultaneously with this action, the carry arm lock 158 will be rotated in a counter-clockwise direction to lock the carry arm 151 in its lowermost position. Also the spring 130 will move the set-up bar 112 to the right which will displace the pin 155 thereon into the slot 157 in the carry arm 151, as shown in Fig. 12. Such movement of the set-up bar 112 will rotate the ratchet gear 124 in a counter-clockwise direction which will move the dial wheel 149 from its zero to its first position. This in turn will move the carry cam 153 to the position indicated in Fig. 12 and the ten cent registration in the register 22 will have been completed.

Thereafter, as the cashier receives the register 22 from the customer he will collect the ten cent charge and position the register 22 onto the mount 25 (Fig. 4) for clearing. In this operation he will place the shoulder 230 of the register base under the permanent clamp 229 and will move the clamp actuating lever 233 in a counter-clockwise direction (Fig. 7) which will engage the movable clamp 227 over the stud 228 on the register. Simultaneously the lug 234 will be moved out of its recess 235 which will permit movement of the mount 25 on its track 224 from the dotted line position (Fig. 4) to its second, or full line, position shown in the figure. Such action will move the cam face 238 (Fig. 6) of the clamp 227 to a point shown in dotted lines where it no longer engages the lock 236. This will permit the movement of the lock 236 to its dotted line position. This movement of the lock 236 will free the handle 213 of the actuating device for movement. Thereafter the cashier will rotate the crank 213 in a counter-clockwise direction (Fig. 7) which will move each of the actuating bars 207 to 211 into engagement with the set-up bars 111, 112, 113, and 114 of the portable register 22.

It will be remembered that as the clamp 227 was moved into its clamping position the shift rod stud 231 is forced against the shift rod 143 to actuate the clearing mechanism of the portable register 22. This action withdrew all of the ratchet pawls 132A, 132, 132C and 132D from engagement with their respective ratchet gears and positioned the pawls 131A, 131, 131C and 131D for engagement therewith. Consequently, and inasmuch as the register dial wheels 149A, 149C and 149D are in their zero positions, movement of the set-up bars 111, 113 and 114 respectively, by the actuating bars 207, 209, and 211 will be only through a minimum distance such as would release the carry arm lock release arms 164 associated with each of these set-up bars, if their carry arms were in locked position. The actuating bar 208, however, will move the set-up bar 112 and the carry cam 153 (Fig. 12) will be rotated in a counter-clockwise direction until the face 171 thereof is moved into engagement with the stop face 172 on the arm 151. Such movement will move the register dial wheel until the zero digit carried thereon is presented to the window 107, and the register 22 will be cleared to its zero setting.

Actuation of the set-up bar 112 in this clearing operation will in turn move the set-up bar 262 of the master register 26 through one position which will cause the master register to indicate a ten cent registration or in other words a registration equal to that cleared from the portable register 22.

While a preferred embodiment of the invention has been illustrated and described, it is apparent that the same is susceptible to many widely different changes and uses. Accordingly it is intended that the representations and descriptions herein made shall be considered as being illustrative only, and nowise in a limiting sense, and that the invention both as to spirit and scope is to be restricted only by the appended claims.

I claim:

1. In a registering system, a register actuating device comprising a base, a plurality of parallelly aligned set-up bars having elongated slots therein, a plurality of rods extending through said slots and fixed at their terminal ends to a pair of spaced uprights mounted on said base, a shaft extending between said uprights above said bars mounting an adjusting lever for each of said set-up bars said lever being connected to said bars and adapted to rotate about said shaft to impart longitudinal movement to their respective bars, a pinion keyed to said shaft for each of said levers, an adjusting arm slidably mounted on each of said levers and carrying a tooth engageable in the teeth of said pinion, a spring for urging the tooth of each adjusting arm into engagement with its respective pinion, a fixed set-up bar carried on said rods, a track in which said base is movable, and means for moving said base a measured distance in said track.

2. Apparatus as claimed in claim 1, in combination with a register having a key means associated therewith, and means for clamping said register in a position with respect to said register actuating means whereby said key means is made operative to condition said moving means for operation to move said base.

3. In a registering system employing a register having movable set-up bars and a clearing mechanism shift, a register clearing device comprising a base, a carriage mounted on said base and adapted to support a register, means associated with said carriage for moving said clearing mechanism shift to its clearing position, and means for moving the set-up bars of said register whereby the register is cleared to a zero setting.

4. In a registering system employing a register having movable set-up bars and a clearing mechanism shift, a register clearing device comprising a base, a carriage supported on said base, means for moving said carriage from a first to a second position, a clearing mechanism shift actuator supported on said carriage, means for clamping a register onto said carriage and positionable in its unclamping attitude to lock said carriage in its first position, a set-up bar moving device mounted on said base having a pair of spaced uprights joined by a plurality of transverse bars, a plurality of elongated bars movable longitudinally with respect to said uprights in slots provided in said transverse bars, a first shaft journaled in said uprights having a plurality of fingers projecting therefrom having parallelly aligned holes at their ends, a second shaft projecting through said holes movable by said fingers against a depending lug carried on each of said elongated bars, yieldable means connecting each of said elongated bars with said second shaft, crank means for rotating said first shaft and means for locking said crank means against movement when said carriage is in its first position said locking means being automatically releasable when said carriage is made to occupy its second position.

5. In a registering system employing a register having movable set-up bars and a clearing mechanism shift, a register clearing device comprising a base, a plurality of elongated actuating bars assembled in parallel relationship with each other and supported on said base by spaced transverse bars interpositioned between a pair of uprights mounted on said base, a first shaft journalled for rotation in said upright members and carrying a crank rotatably movable with said shaft having a plurality of parallelly spaced arms provided with holes at their terminal ends, a second shaft extending through the holes and said arms, a tension spring connectible with each of said actuating bars at one end and at the other end on said second shaft, a handle for rotating said crank whereby said actuating bars are yieldably moved longitudinally of said uprights, a register carrying mount supported on said base and moved transversely of said clearing device, a trackway upon which said register mount is movable from a first to a second position, a clearing mechanism-shift actuating element carried on said mount, a register clamping means associated with said mount, adaptable in its unclamped position to lock said mount in its first position and in its clamping position to release said mount for movement to its second position, a locking device supported by said base, retainable in a locking position when said mount is in its said first position and actionable when said mount is moved to its second position to a releasing position whereby said handle of said clearing device is made operative to actuate said actuating bars.

6. In a register system employing a portable register having movable set-up bars and a clearing mechanism shift, a clearing and transfer unit comprising a base, a set-up bar actuating device and a master register mounted on said base in spaced relationship with each other, a carriage for said portable register supported on said base and movable on a track from a first position to a second position whereby the set-up bars of said portable register are moved into alignment to be actuated by said actuating device and to actuate set-up bars in said master register, means associated with said carriage for operating said clearing mechanism shift, a clamping device for securing the portable register to said carriage said device being operable in its unclamping attitude to lock said carriage in its first position, a locking means prohibiting the operation of said actuating device when said carriage is in its first position, a locking means prohibiting the operation of said actuating device when said carriage is in its first position and automatically releasable when the same is in its second position, a movable mount for supporting said master register, and means actionable upon operation of said set-up bar actuating device to displace said movable mount to position said master register in close proximity with said portable register whereby movement of the latter's set-up bars during clearing effects a transfer of the registration in the portable to the master register.

7. In a registering device, a set-up bar mounted for longitudinal movement in a first direction, power means for moving said set-up bar in a second direction opposite to the first, a ratchet arm pivoted for movement about a ratchet arm shaft, a ratchet gear mounted for rotation about said shaft, first and second ratchet pawls supported on the ends of said ratchet arm for engagement with said ratchet gear said second ratchet pawl being engaged and said first ratchet pawl being disengaged with said ratchet gear, normally, a dial pinion mounted to be rotated by said ratchet gear, a digit indicating dial mounted for rotation with said pinion through ten positions, said set-up bar being displaceable in its first direction through a measured distance to effect, upon movement in its second direction, a rotation of said dial through one of its ten positions or a multiple thereof.

8. Apparatus as claimed in claim 7 including a register clearing mechanism comprising means for shifting said first ratchet pawl into engagement with, and said second ratchet pawl out of engagement with, said ratchet gear and vice versa; and stop means associated with said registering dial whereby the same is moved to its zero position and whereby displacement of said set-up bar is stopped when said shifting means is in clearing position.

9. In a registering device, first and second set-up bars mounted for longitudinal movement in a first direction, power means for moving said set-up bars in a second direction opposite to the first, a first and second ratchet arm pivoted for movement about a ratchet arm shaft, a first and second ratchet gear mounted for rotation about said shaft, a first and second pawl supported on the ends of each of said first and second ratchet arms, a ratchet pawl cam associated with each of said ratchet arms movable to bring the first pawl into engagement with, and the second pawl out of engagement with, their respective ratchet gears and vice versa, a first and second dial pinion meshing respectively with said first and second ratchet gears, a first and second digit indicating dial adapted respectively to be rotated through ten positions by said first and second dial pinions, a first and second carry cam associated respectively with said first and second dials and fixed to turn with them, a carry arm associated with the second of said set-up bars having a shoulder normally engageable with a pin on said second set-up bar to hold the latter toward its first direction of movement against the forces of said power means, means for mounting said carry arm to pivot from a raised position characterized by the contact engagement of said shoulder and said pin to a lowered position whereby said second set-up bar is moved in its second direction under the forces of said power means to move said pin into a slot in said carry arm so dimensioned as to provide a measured displacement of said second set-up bar to move said second dial through one position, said first carry cam being operative to cam said carry arm to its lower position when said first dial is moved from its ninth to its zero position.

10. Apparatus as claimed in claim 9 including a stop means on said carry arm against which said first carry cam is movable upon displacement of said first set-up bar in its first direction to move said first digit dial to its zero position.

11. Apparatus as claimed in claim 9 including means for locking said carry arm in its lower position, and means for releasing said locking means when said second set-up bar is displaced in its first direction.

12. Apparatus as claimed in claim 9 including a stop means on said carry arm against which said first carry cam is movable upon displacement of said first set-up bar in its first direction to move said first digit dial to its zero position, means for locking said carry arm in its lower position, and means for releasing said locking means when said second set-up bar is displaced in its first direction.

13. In a register, a plurality of digit dials each rotatable through ten positions to effect a registration, a ratchet gear for rotating each of said dials, ratchet means associated with each of said ratchet gears for rotating each of said gears in two directions, means for controlling said ratchet means to selectively cause the rotation of said gears first in one direction and then in the opposite direction, a set-up bar for each of said ratchet means movable in a first direction against the action of a power means and in a second direction under the forces of said power means, a carry bar associated with each of said set-up bars less one, and a carry cam fixed to rotate with each of said dials having a face engageable with a stop means carried on each of said carry arms, said carry cams being operable to actuate said carry arms whereby upon rotation of a dial through one complete revolution a dial of a next highest order is moved through one of its ten positions.

14. In a register having a plurality of digit indicating dials, the combination of a plurality of set-up bars movable in a first instance through measured distances to rotate said dials to effect an indication, means for conditioning said set-up bars to be moved in a second instance through measured distances to return said dials to a zero setting, said measured distances in the second instance being identical with those of the first, and means for mounting said set-up bars whereby end faces thereof are presented for contact externally of said register.

15. In combination in a registering system, a first and a second register each comprising a plurality of digit indicating dials, a plurality of set-up bars movable in a first instance through measured distances to rotate said dials to effect an indication, means for conditioning said set-up bars to be moved in a second instance through measured distances to return said dials to a zero setting said measured distances in the second instance being identical with those of the first, and means for mounting said set-up bars whereby end faces thereof are presented for contact externally of said register, said first and second registers being arranged in a manner such that the set-up bars of the first contact the set-up bars of the second whereby movement of the set-up bars of the first register in their second instance displace the set-up bars of the second register in their first instance to cause the same to receive an indication identical with that cleared from the first register.

VICTOR STROH.

REFERENCES CITED

The following references are of record in the file of this patent:

UNITED STATES PATENTS

| Number | Name | Date |
|---|---|---|
| 627,571 | Clifford | June 27, 1899 |
| 1,118,185 | Church | Nov. 24, 1914 |
| 1,278,613 | Dysart | Sept. 10, 1918 |
| 1,309,897 | Lasker | July 15, 1919 |
| 1,404,280 | Dixon et al. | Jan. 24, 1922 |
| 1,454,108 | Dixon et al. | May 8, 1923 |
| 2,127,769 | Esgro | Aug. 23, 1938 |
| 2,212,639 | Garbell | Aug. 27, 1940 |
| 2,226,960 | Anderson | Dec. 31, 1940 |
| 2,313,424 | Esgro | Mar. 9, 1943 |